United States Patent [19]

Wu

[11] Patent Number: 5,004,254
[45] Date of Patent: Apr. 2, 1991

[54] DRAG BAR MOUNTING STRUCTURE FOR A GOLF BAG DRAG CARRIAGE

[76] Inventor: Jiin-Tang Wu, No. 35-1, Jih Hsin St., Tu Cheng Hsiang, Taipei Hsien, Taiwan

[21] Appl. No.: 521,633

[22] Filed: May 10, 1990

[51] Int. Cl.$^5$ .............................................. B62B 1/12
[52] U.S. Cl. .............................................. 280/47.315
[58] Field of Search ............ 280/47.36, 47.37, 47.315, 280/DIG. 5, DIG. 6, 645, 646, 42, 652, 655, 655.1, 47.18, 47.24, 47.26; 224/919, 918; 248/96; 74/543, 547, 551.1

[56] References Cited

U.S. PATENT DOCUMENTS 4,936,598  6/1990  Lee ............................... 280/DIG. 6

*Primary Examiner*—Andres Kashnikow
*Assistant Examiner*—Richard Camby
*Attorney, Agent, or Firm*—Varndell Legal Group

[57] ABSTRACT

A drag bar mounting structure is provided to secure a drag bar to the frame of a golf bag drag carriage permitting a drag bar to be adjusted axially and radially relative to the frame of a golf bag drag carriage. Two opposite mounting shells are secured to the frame of a golf bag drag carriage and controlled by an adjusted device to squeeze a resilient swinging block to firmly retain the drag bar therein. The swinging block is bilaterally mounted on two guide posts of the two opposite mounting shells so that it can be moved to swing thereon for adjusting the radial position of the drag bar relative to the frame of the golf bag drag carriage.

4 Claims, 3 Drawing Sheets

5,004,254

DRAG BAR MOUNTING STRUCTURE FOR A GOLF BAG DRAG CARRIAGE

BACKGROUND AND SUMMARY OF THE INVENTION

The present invention is related to golf bag drag carriages and more particularly to a golf bag drag carriage which has an improved drag bar mounting structure permitting a drag bar to be adjusted axially and radially relative to the frame of a golf bag drag carriage.

Regular golf bag drag carriage, as shown in FIG. 4, generally has a drag bar coupled with a handhold for the holding of the hand to pull the carriage to move. In the conventional golf bag drag carriages, a drag bar can only be adjusted axially or radially relative to the frame of a golf bag drag carriage. Further, in the conventional golf bag drag carriages, a drag bar may be easily disengaged from the frame of a golf bag drag carriage.

It is an object of the present invention to provide a drag bar mounting structure for a golf bag drag carriage which can firmly secure a drag bar to the frame of a golf bag drag carriage.

Another object of the present invention is to provide a drag bar mounting structure for a golf bag drag carriage in which the axial and angular position of a drag bar relative to the frame of a golf bag drag carriage can be conveniently adjusted.

According to the present invention, a drag bar mounting structure for a golf bag drag carriage comprises a resilient swinging block movably fastened in a mounting device and having a key hole vertically piercing therethrough for mounting a drag bar; a positioning member connected to the bottom end of the drag bar and having a conical bottom end inserted in a frame bar of the frame of a golf bag drag carriage; and an adjusting device transversely fastened through the mounting device and the swinging block to force the mounting device to squeeze the swinging block so as to firmly retain the drag bar therein.

BRIEF DESCRIPTION OF THE DRAWINGS

FIG. 2-1 and 2-2 illustrate the operation of the present invention to adjust the position of the drag bar.

DETAILED DESCRIPTION OF THE PREFERRED EMBODIMENTS

Figure 1:
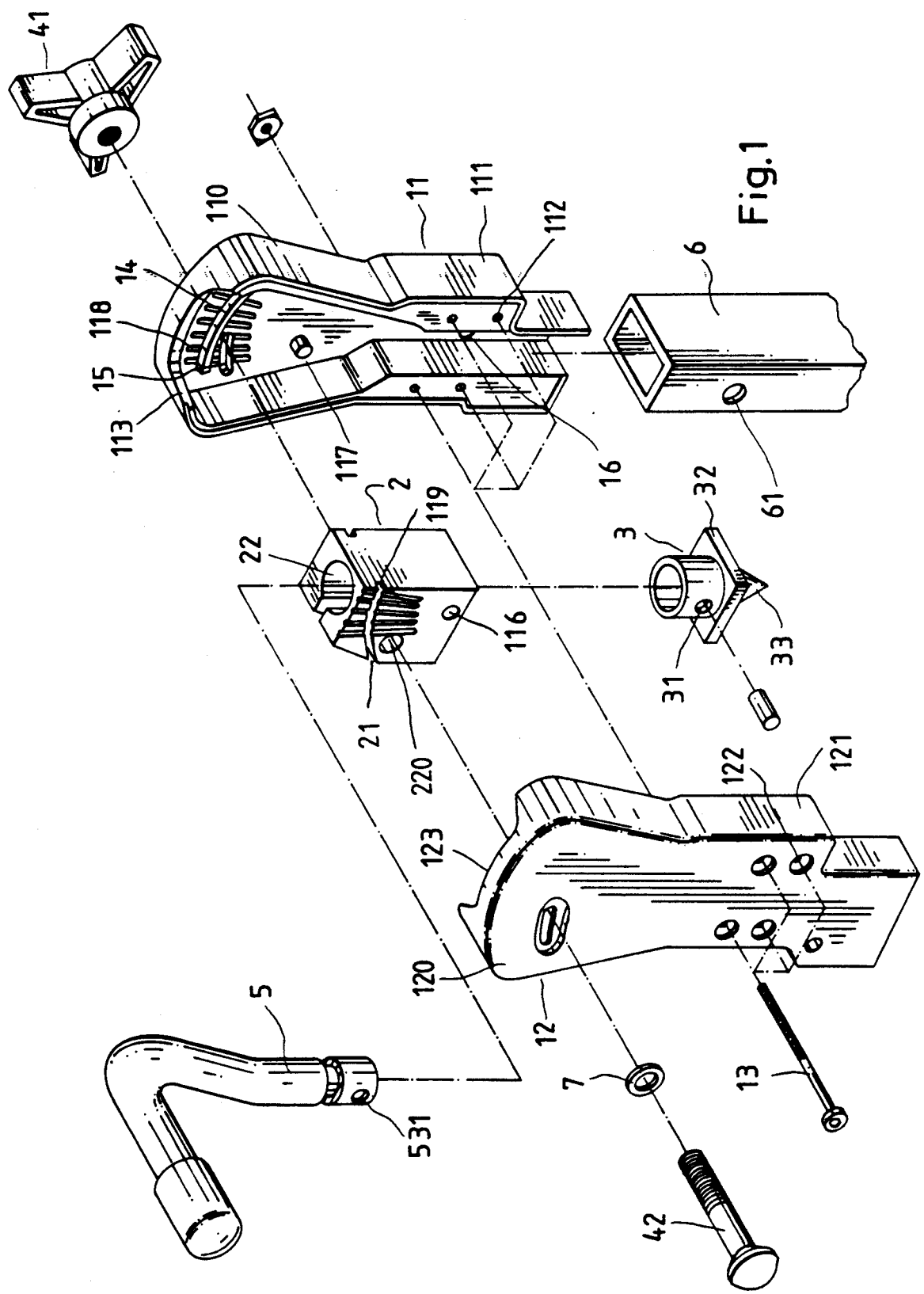
FIG. 1 is a perspective exploded view of the present invention.
Figure 3:
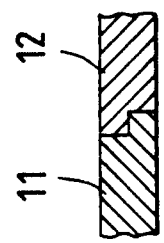
FIG. 3 is a sectional end view illustrating the connection of the two opposite mounting shells.
Figure 2:
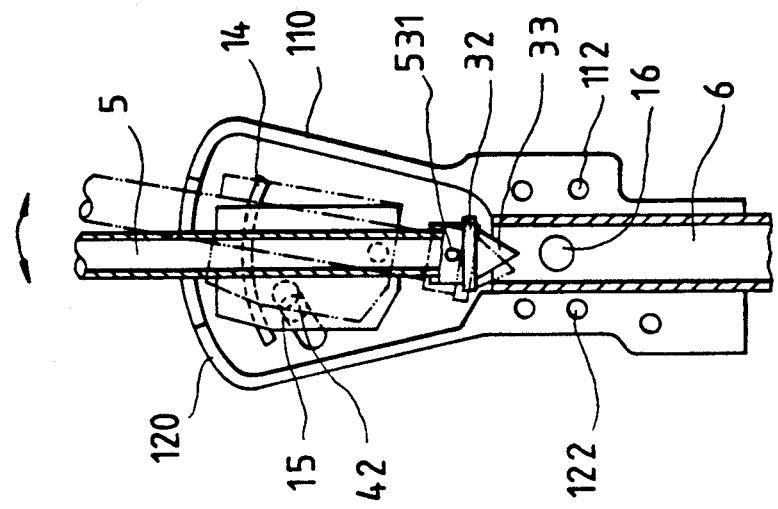
Figures 1, 2:
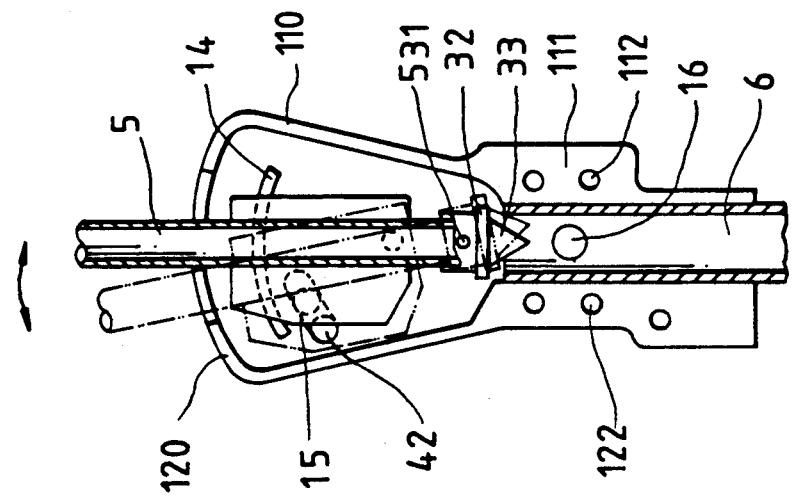
Figure 4:
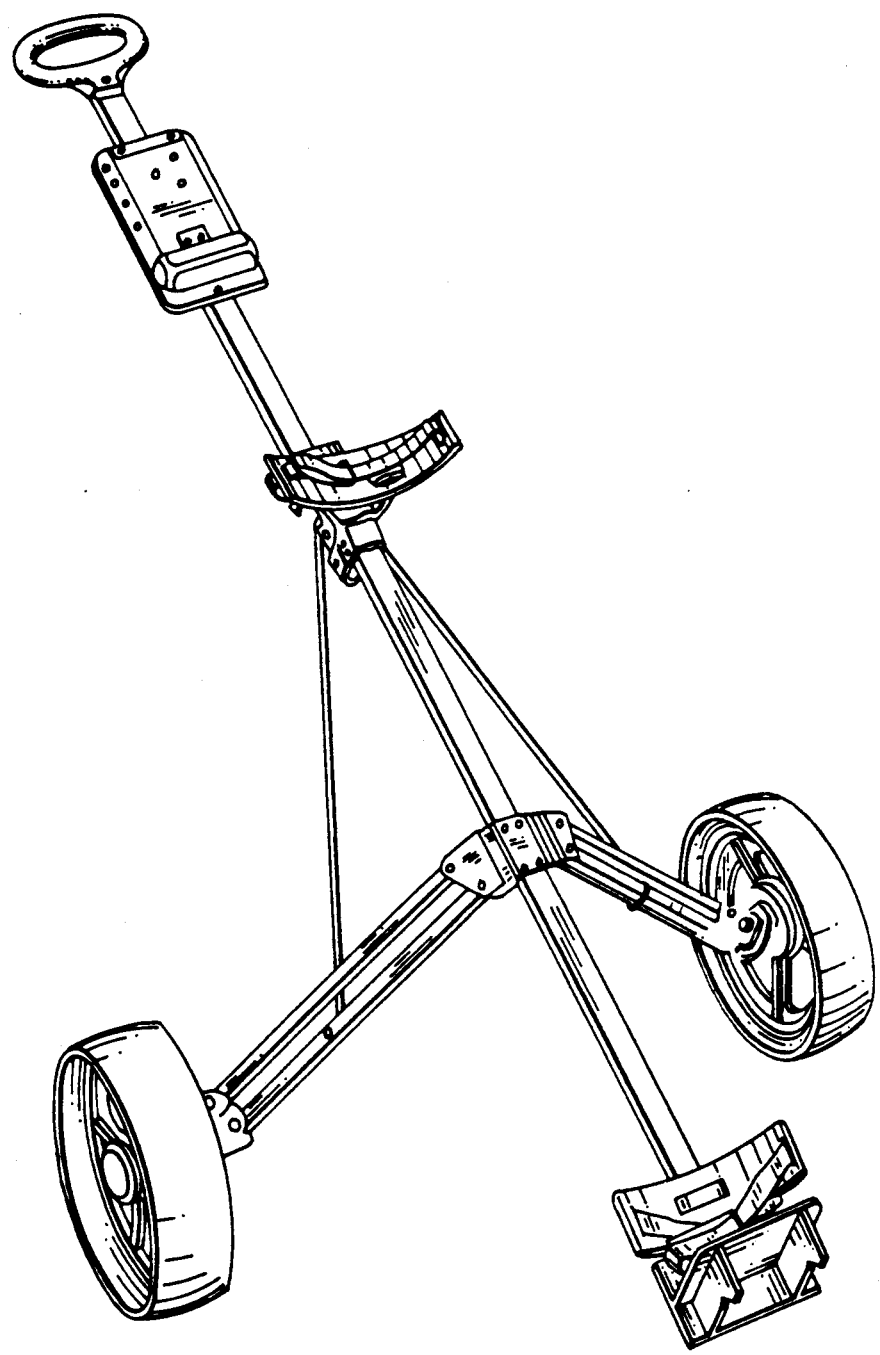
FIG. 4 is a perspective view of a golf bag drag carriage according to the prior art.

Referring to FIG. 1, a drag bar assembly for a golf bag drag carriage in accordance with the present invention is generally comprised of a mounting device 1, a swinging block 2, a positioning member 3, an adjusting device 4, a drag bar 5 and a frame bar 6.

As illustrated, the mounting device 1 is comprised of two opposite mounting shells 11, 12 and a plurality of fastening elements 13. The two opposite mounting shells 11, 12 comprise each an unitary, rectangular connecting portion 111 or 121 vertically extending downward from a substantially U-shaped holder portion 110 or 120 for connecting a frame bar 6 which is a part of the frame of a golf bag drag carriage to which the drag bar of the present invention is secured. A plurality of mounting holes 112 or 122 are made on the connecting portion 111 or 121 of each of the two opposite mounting shells 11, 12 so that corresponding quantity of fastening elements 13 can be inserted therethrough to secure the two opposite mounting shells 11, 12 together. An unitary pin 16 extends from the inner wall of the connecting portion 111 or 121 of each mounting shell 11 or 12 for fastening in the frame bar 6. The holder portion 110, 120 of the two opposite mounting shells 11, 12 have each a notch 113 or 123 on its topmost edge, and a transversely curved, raised strip 14, a circular guide post 117, a rectangular hole 15 and a plurality of radial, convex stripes 118 on its inner wall.

The swinging block 2 is a substantially elongated block unitarily made of resilient plastic material through shape molding process having a key hole 22 vertically and laterally piercing therethrough, a guide post hole 116 transversely piercing therethrough at a lower position, a pivot hole 220 transversely piercing therethrough at a higher position near one lateral side, two curved grooves 21 transversely made on its two opposite side walls, and a plurality of concave stripes 119 radially made on its two opposite side walls and respectively intersecting with the two curved grooves 21. The two curved grooves 21 are made in width slightly wider than the thickness of the transversely curved, raised strips 14 of the two opposite mounting shells 11, 12.

The positioning member 3 comprises a tubular body having a conical bottom end 33, a rectangular flange 32 and a rivet hole 31. After the swinging block 2 is mounted on the drag bar 5, the positioning member 3 is inserted in the drag bar 5 and fixedly secured therein by means of a rivet 531 which is fastened in the drag bar 5 through the rivet hole 31.

The adjusting device 4 is comprised of a swivel knob 41 and a screw rod 42. The screw rod 42 is inserted from the rectangular hole 15 of a first mounting shell 11 or 12 through the pivot hole 220 of the swinging block 2 and the rectangular hole 15 of the other mounting shell 11 or 12 to connect with the swivel knob 41. During the fastening of the adjusting device 4, a washer 7 is mounted on the screw rod 42 to reduce possible wearing problem. By means of the control of the adjusting device 4, the swinging block 2 can be firmly squeezed or released so that the positioning of the drag bar 5 inside the two holder portions 110, 120 of the two opposite mounting shells 11, 12 and relative to the frame bar 6 can be conveniently adjusted.

During assembly, the two opposite mounting shells 11, 12 are connected together by means of the fastening elements 13 with the drag bar 5, the swinging block 2 and the frame bar 6 squeezed in therebetween, permitting the pins 16 thereof bilaterally inserted in a pivot hole 61 which pierces through the frame bar 6. When the drag bar 5 and the swinging block 2 are squeezed in between the two opposite mounting shells 11, 12 the conical bottom end 33 of the positioning member 3 is inserted in the frame bar 6; the two circular guide posts 117 of the two opposite mounting shells 11, 12 are bilaterally inserted in the guide post hole 116 of the swinging block 2; the two raised strips 14 of the two opposite mounting shells 11, 12 are respectively set in the two curved grooves 21 of the swinging block 2; the convex stripes 118 of the two opposite mounting shells 11, 12 are bilaterally engaged in the concave stripes 119 of the swinging block 2; the frame bar 6 is retained between the fastening elements 13 and the two opposite mounting shells 11, 12.

By means of the foregoing arrangement, the aforesaid parts are respectively secured together against breaking away from one another and the angular position of the drag bar 5 relative to the frame bar 6 can be conveniently adjusted.

I claim:

1. A drag bar mounting structure for a golf bag drag carriage, comprising:

a drag bar having a handhold on its top end for holding by hand;

a mounting device for securing said drag bar to a frame bar of a frame of a golf bag drag carriage, including two opposite mounting sheels connected together by means of a plurality of fastening elements; said two opposite mounting shells each having a unitary pin extending from its inner wall surface at a lower position thereof; a circular guide post extending inwardly from its inner wall surface at a middle position thereof, a notch on its topmost edge, a transversely curved and raised strip on its inner surface near its top, a rectangular hole transversely piercing its inner wall surface, and a plurality of radial and convex stripes on its inner wall surface;

a swinging block made of resilient plastic material through a shape molding process and having a key hole extending vertically through its length, a plurality of concave stripes radially arranged on a portion of opposing sides of said swinging block, a groove extending through said swinging block and intersecting said stripes, a guide post hole horizontally passing through a lower portion of said swinging block beneath said concave stripes, and a pivot hole horizontally passing through said swinging block above said guide post hole and adjacent said stripes;

a positioning member secured to a bottom end of said drag bar by means of rivet joint and having a conical bottom end inserted in a top of said frame bar and a rectangular flange for preventing said drag bar from moving away from said mounting device; and an adjusting device including a screw rod inserted through said rectangular hole of said two opposite mounting shells and said pivot hole of said winging block, and connected with a swivel knob; said adjusting device permitting said mounting device to squeeze said swinging block for retaining said drag bar in position;

wherein said drag bar is received in said key hole of said swinging block between said two opposite mounting shells, said circular guide posts of said two opposite mounting shells are respectively received in opposite ends of said guide post hole of said swinging block, said two raised strips of said two opposite mounting shells are respectively received in opposite ends of said groove of said swinging block, and said convex stripes of said two opposite mounting shells respectively engage said concave stripes of said swinging block.

2. A drag bar mounting structure for a golf bag drag carriage according to claim 1, wherein said swinging block is mounted on said two guide posts of said two opposite mounting shells for permitting said swinging block to swing thereon for adjusting a position of said drag bar relative to said frame bar.

3. A drag bar mounting structure for a golf bag drag carriage according to claim 1, wherein said drag bar has a shape closely matching said key hole of said swinging block for firmly retaining said drag bar within said key hole.

4. A drag bar mounting structure for a golf bag drag carriage according to claim 1, wherein said fastening elements are bilaterally fastened in said mounting device and retain said frame bar therebetween for inhibiting said frame bar from moving transversely relative to said mounting device.

* * * * *